Aug. 8, 1967   G. E. CARNEGIE   3,334,527
POSITIVE VARIABLE SPEED TRANSMISSION UNIT
Filed June 3, 1965   3 Sheets-Sheet 2
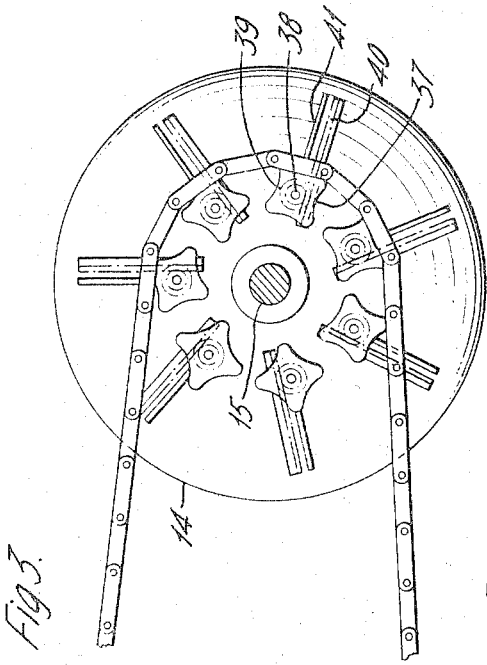
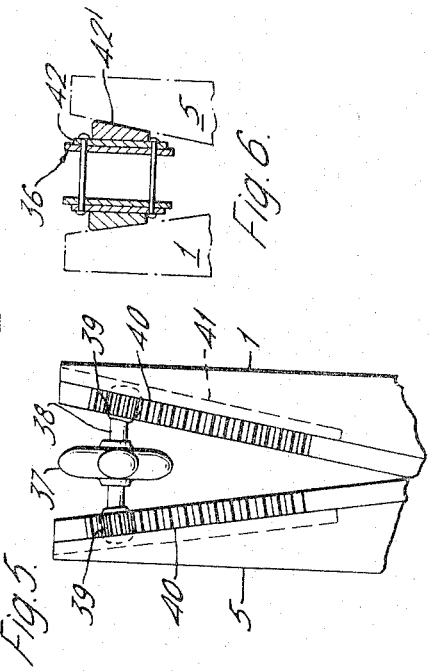
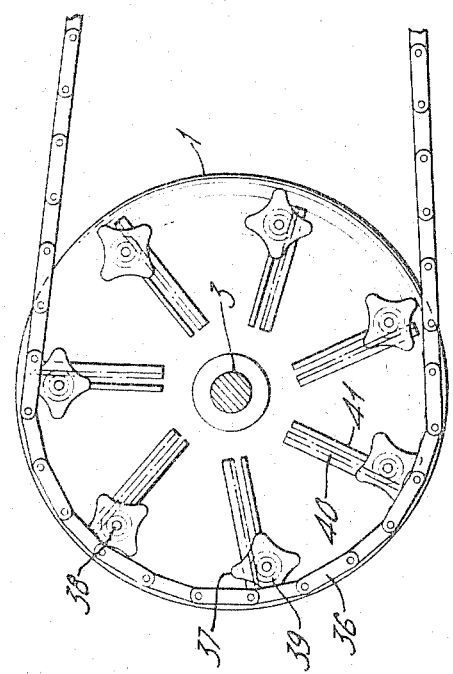
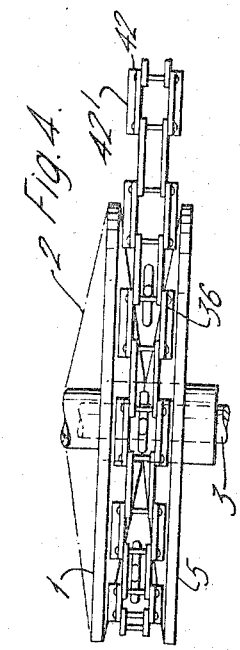
INVENTOR
George E. Carnegie
BY
ATTORNEY Aug. 8, 1967  G. E. CARNEGIE  3,334,527
POSITIVE VARIABLE SPEED TRANSMISSION UNIT
Filed June 8, 1965  3 Sheets-Sheet 3

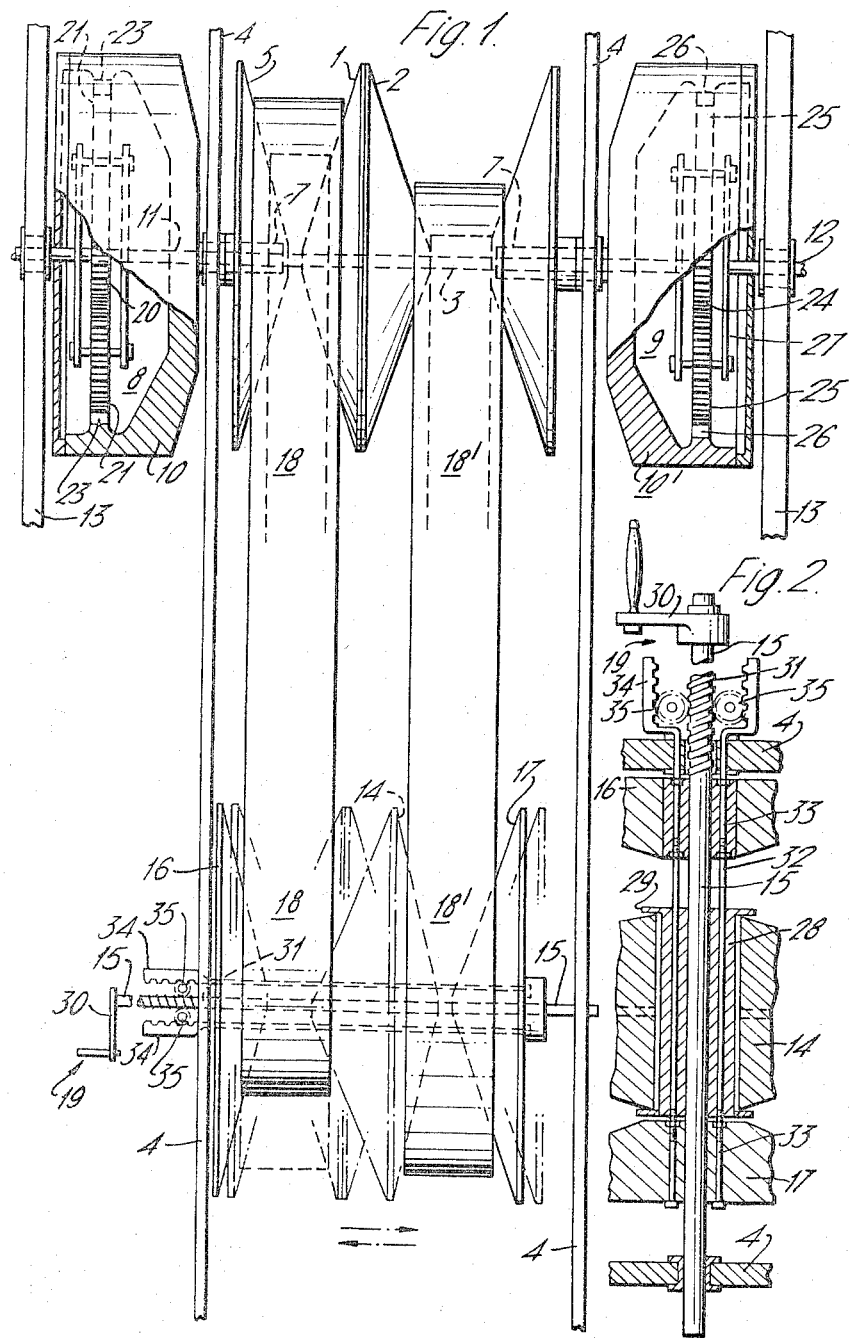

INVENTOR
GEORGE E. CARNEGIE
BY
ATTORNEY

United States Patent Office 3,334,527
Patented Aug. 8, 1967

3,334,527
POSITIVE VARIABLE SPEED TRANSMISSION UNIT
George E. Carnegie, 310 Alexander Bldg.,
Edmonton, Alberta, Canada
Filed June 9, 1965, Ser. No. 462,624
4 Claims. (Cl. 74—689)

ABSTRACT OF THE DISCLOSURE

The invention relates to a variable speed transmission unit consisting of a drive planeary gear assembly and a driven planetary gear assembly with two pairs of opposed cone pulleys all mounted on a shaft in alignment with one another and having a further two sets of cone pulleys on a lay shaft spaced from the planeary gear assemblies. Drive means in the form of belts or chains extend around the corresponding cone pulleys and an adjustment mechanism is situated on the lay shaft to vary the distance between adjacent cone pulleys thereon thus changing the speed of the driven planetary gear assembly with relation to the speed of the drive gear assembly.

---

My invention relates to new and useful improvements in positive variable speed transmission units whereby power transmissions may have their speeds varied readily without loss of power occurring.

My invention utilizes a pair of planetary gear systems one on the driving side and one on the driven side having freely rotating annuli and having means therebetween in order to vary the rotative components of the gear systems thus eliminating the conventional method of braking the annuli which results in a loss of power.

A further object of my invention is to provide a device of the character herewithin described which is adaptable either for use with opposing cone-faced pulleys and belts or, alternatively, with a further planetary gear system actuating an oil paddle system in order to produce the same effect.

Yet another object of my invention is to provide a device of the character herewithin described in which either system can be used depending upon the circumstances and the function of the machine.

A still further object of my invention is to provide a device of the character herewithin described which is extremely simple to maintain and repair.

A still further object of my invention is to provide a device of the character herewithin described which is adaptable for use in a wide range of applications and which takes up the minimum of space in its construction.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a top plan view of my device sectioned in part to show the interior thereof.

FIGURE 2 is an enlarged cross-sectional detail showing the mechanism for slidably shifting pulleys oppositely in direction.

FIGURE 3 is a side elevation of a pair of cone pulleys showing my chain belt system.

FIGURE 4 is a fragmentary plan view of FIGURE 3.

FIGURE 5 is an enlarged fragmentary detail of two pulleys in the closed position showing the spindle and rack gears and the like.

FIGURE 6 is a sectional view of one of chain links.

In the drawings like characters of reference indicate corresponding parts in the different figures.

Figure 7:
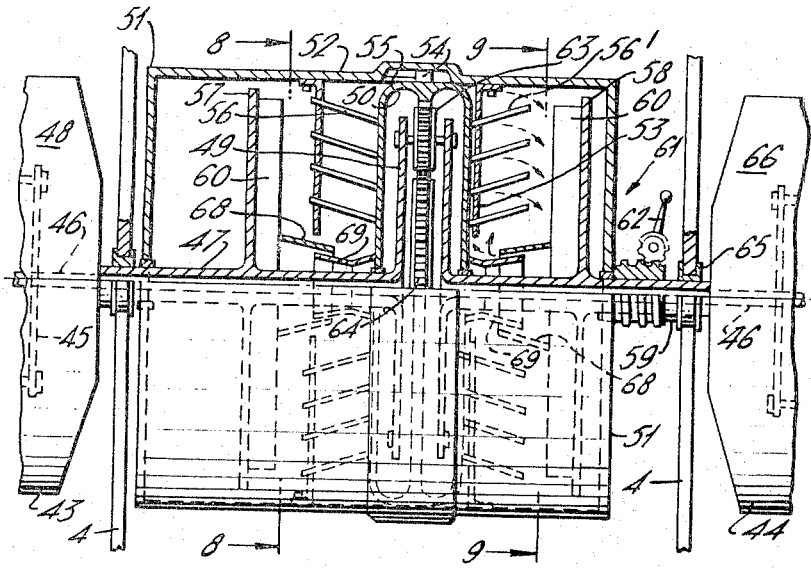
FIGURE 7 is a half sectional view of a further embodiment of my device showing the oil control gear planetary system.
Figure 8:
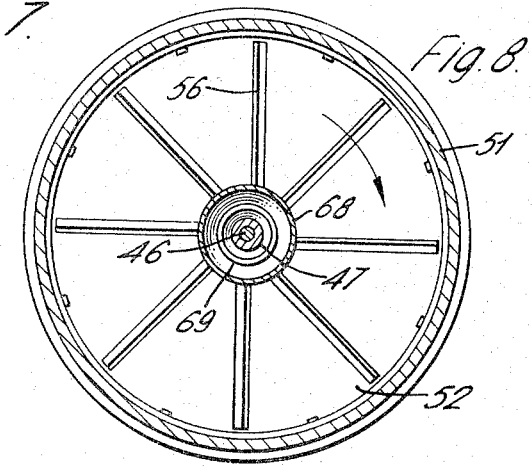
FIGURE 8 is a section substantially along the lines 8—8 of FIGURE 7.

This invention embodies a means of varying speed in power transmission machines by the use of opposed conical faced pulleys so adapted and manipulated to approach one another and to separate from one another to effect the desired speed variations in co-operation with either chain or belt coupled drive means, all as herein described.

A pair of cone-faced pulleys 1 and 2 are mounted on a shaft 3 in base to base or back to back contact with one another, said shaft being bearably supported towards each of its ends indirectly on two parallel frame members 4. These pulleys are rotatable relatively with, but independently of said shaft, and are slidable longitudinally along same. Indirectly mounted on this shaft are two cone faced pulleys 5 and 6 each with its conical face respectively opposite to the said pulleys 1 and 2, one on each side of same, and are fixedly mounted on sleeves 7 through which sleeves the shaft 3 bearably passes. The ends of this shaft terminate within planetary gear type elements 8 and 9, as subsequently described operably in detail. The elements 8 and 9 comprise rotatable outer cases 10 and 10' respectively to each of which case is attached one of said sleeves 7. Thus any rotation of cases 10 and 10' will rotate the pulleys 5 and 6 respectively in either direction, or they will remain stationary dependent on regulatory means.

A drive shaft 11, and the subsequently driven shaft 12, are bearably mounted on said frame members 13 in spaced relationship from members 4, and between which the above described apparatus is supported.

A double cone faced single pulley 14 faced similarly to pulleys 1 and 2 is rotatably mounted on lay shaft 15 which is parallel with shaft 3, said shaft being bearably mounted on the extended frame members 4 as seen in FIGURE 1. Means later set forth permit the pulley 14 to move longitudinally with the shaft 15. A pair of cone pulleys 16 and 17 are duplicates of pulleys 5 and 6, and are mounted to rotate freely on shaft 15, but are slidable longitudinally therewith the same as pulley 14. A V-type belt 18 traverses between the two sets of pulleys 1 and 5 and pulleys 14 and 16, and another V-belt 18' between pulleys 2 and 6 and pulleys 14 and 17.

A geared cranking means collectively numbered 19 operates by worm and screw action to slide pulley 14 longitudinally with the shaft 15. A manipulation in one direction spreads the cone pulleys 16 and 14 apart, and at the same time draws the pulleys 17 and 14 together as subsequently described. These sidewise movements of pulleys as stated cause the belts to creep up and/or down the opposed conical faces of both sets of these pulleys as such movements are controlled at 19.

In explanation of the resultant effect produced by this alternation of belt movements the following description is necessary.

In a planetary gear system 8 is seen a central small diameter gear 20 driven by the shaft 11, which gear meshes with two diametrically opposed planetary gears 21 of larger diameter and mounted on a spider frame 22. Said gears 21 mesh with peripheral teeth 23 within the annulus or case 10. Therefore, case 10 turns slowly in comparison with the shaft 11, or under certain conditions not at all. The difference between my gear cases and conventional planetary cases is that my outer case is free to rotate instead of being anchored.

The spider 22 is affixed to the shaft 3, which is affixed by the other end thereof to a larger diameter gear 24 with the case 10' of gear system 9. This gear 24 engages diametrically opposed gears 25 of smaller diameter than gear 24, which small gears mesh with peripheral teeth 26 within the case 10'. A spider frame 27 mounting the gears 25 transmits rotation to the shaft 12 as the planet gears rotate around the sun gear.

Upon the principle of this particular planetary system of gearing will depend the variation of speed between shafts 11 and 12, but only as the controlling mechanism at 19 so shifts the cone pulleys 16, 14 and 17 to varying relative positions, resulting in the belts (or chains as later described) riding up and down between the opposed cone faces away or toward their mounting shafts, as said pairs of conical faces are closing or separating as so manipulated by the mechanism at 19.

In FIGURE 2 is an enlarged detail showing the means for controlling the longitudinal movements of pulleys 14, 16 and 17 on the shaft 15. Pulley 14 is mounted to rotate on a bearing sleeve 28 with end flanges 29. This sleeve is affixed on the shaft 15 and will move longitudinally therewith as the crank 30 is turned. This movement is due to a worm on the shaft engaging worm teeth in a bearing 31 in the stationary frame 4. Rods 32 pass longitudinally through sleeve 28 and are affixed to the sleeves 33 bearing on the shaft. Pulleys 14 and 17 are free to rotate on said sleeve 33. A rack 34 is affixed to the end of each rod 32 at this wormed end of the shaft 15. Gears 35 engage between these racks and the worm on shaft 15. Consequently turning the crank 30 moves the rods longitudinally one way to shift pulleys 16 and 17, and the other way to shift pulley 14 in the opposite direction. This provides the means to vary belt speed as the constant speed of shaft 11 is transmitted to the speed regulating planetary gear systems 8 and 9.

Referring to these planetary gear systems in their function and operation—these gear systems are conventional except that their outer casing 10 and 10' with their inner peripheral toothed racks 23 and 26 respectively are rotatable and not anchored, as previously mentioned, as influenced by the speed requirements as controlled by the crank 30, which is so manipulated as to regulate the relative positioning of the belts between their respective shift pulleys 14, 16 and 17. It is apparent that with constant r.p.m. of drive shaft 11 the spider frame 22 will rotate at a lower speed, turning the shaft 3 as also the large diameter gear 24 within the other planetary system 9. Since the longitudinal movements of all pulleys 5, 1, 2 and 6 are regulated by the controlled longitudinal movements of pulleys 16, 14 and 17, the belts ride up and down the contacted faces of their respective pulleys. This is an essential requirement of the apparatus to vary the speed of the driven shaft 12.

In the preferred type of speed adjusting means as seen in FIGURES 3, 4 and 5, linked chains are shown collectively at 36. These are operated on exactly the same principle as the belts, but provision is made to permit the chains to travel up and down the faces of the cone pulleys in constant contact therewith as these pulleys are shifted longitudinally. In order to achieve this, pinions 37 are mounted centrally on transverse spindles 38, the teeth of same engaging the pins connecting the chain links. On the end of each spindle is a spur gear 39 which meshes with a rack 40 affixed to each sloping face of the pulley. Thus gears 39 travel inwardly towards the pulley axis as the cone pulleys are separated, and conversely travel away from the axis as the pulleys approach one another. In order to maintain the spindles in transverse line their ends are slidable in grooves 41 indented in the conical faces of the pulleys from the centre outwards. Wherewith these grooves are indicated diagrammatically in the drawings as straight, they would actually be curved to conform with the conical faces of the pulleys as they rotate relative to the gears 39. Also the outer links of the chains 42 are so shaped as at 42' to conform with the slope of the cone faces. This feature is seen only in FIGURES 4 and 6.

The speed variation depends on the manipulation of crank 30 and the essential shifting of pulley 14 to right or left with the shaft 15, and the opposite movements along the same shaft of the pulleys 16 and 17. There will thus be theoretically provided an infinite variation of speeds between these drive and driven shafts 11 and 12 respectively in conjunction with the planetary systems.

Referring particularly to these planetary systems as providing this speed regulation and variation in co-operation with the controlled belt speed adjusting means, the regulating gears within planetary system apparatus 8 transmits this variation to gear 24 in the planetary system 9. The variation can provide either no rotation of shaft 12 or the desired speed and direction of shaft 12 as controlled by the relative positions between each belt. Such positions are dependent on manipulation of crank 30 as stated.

It is to be noted that gear 24 and case 10 always rotate in opposite directions due to the internal gear combinations, and that if the speeds of each are equal there is no rotation of the shaft 12. Now, if the speed of gear 24 is increased, and that of case 10' decreases by positioning of the belts or chains by manipulation, this gives a particular rotation direction to shaft 12 (say clockwise) and the amount of this increase and of decrease decides the variable speed of shaft 12 in a clockwise direction. To attain reverse direction for shaft 12 (anti-clockwise) it is necessary that case 10' and gear 24 are at equal speeds at first and gradually to increase speed of 10' as desired, when the speed of gear 24 automatically reduces. Since pulley 5 is attached to the case 10' through the sleeves 7, the variation of these pulleys' speeds by their respective belts or chains provides the desired variation in speed to the shaft 12.

A further means of obtaining the same required speed control is shown in FIG. 7 and is herewith described, in which oil is employed as the control medium in place of the belts or chains. I define this as an oil control planetary gear system. This consists of end planetary gear systems as before and numbered 43 and 44. A spider frame 45 as before is connected with the main shaft 46, which shaft runs in a sleeve 47 integral with the case 48 of said planetary 43. This sleeve is affixed at its opposite end to a central spider frame 49 within a gear case or annulus 50, said gear case housing a planetary system of gears, and is mounted to run freely on said sleeve 47. A circular case 51 encloses this gear case 50 and is slidable longitudinally with respect thereto and is rotatable on the sleeve 47.

Two discs 52 and 53 within the outer case 51 are fixed to rotate therewith, and are in variable longitudinally spaced relationship with the gear case 50 since case 51 to which they are attached is slidable longitudinally. The case 50 has a toothed rack 54 around its outer peripheral face which engages slidably longitudinally within a recess 55 indented around the inner face of case 51, as a means for sliding the case 50 relatively with the gear case 50. The case 51 is partially filled with oil, and projecting in circular formation from the outer faces of the sides of the case 50 are oil paddles 56 and 56' angularly disposed with relation therewith. These paddles project the oil during rotation against two disc plates 57 and 58, which rotate with the sleeves 47 and 59 respectively. The disc plates 57 and 58 have radial baffles 60, so that the oil impacting them by paddle members 56' on the one side tends to brake or slow down the speed for regulation of this disc plate 58 on this side, and likewise slowing down the speed of disc plate 57 on the other side, depending respectively on the amount of projection of the paddles 56 and 56'. The paddles 56 and 56' engage the discs 52 and 53 through a series of slots therein in a slidable manner as the case 51 moves sideways, so that oil is projected in the required amounts as the case 51 is so moved one way or the other. This movement of the case 51 is effected by means of a rack and gears collectively shown at 61 and with a handle and crank 62 similarly to the previous disclosure.

On the spider 49 are planetary gears 63 and a centre sun gear on shaft 46 meshes with same. This gear 64 is integral with sleeve 59 rotatable on the shaft 46, which shaft passes through a bearing 65 in the framing member 4, sleeve 59 being attached to the outer framing case 66 of the end planetary system 44 and the shaft is integral with the middle gear in the planetary system 44.

In order to reduce the width of the apertured slots (not shown) in discs 52 and 53 through which the paddles 56 and 56' pass for oil control, and eventual speed regulation, the teeth 54 on case 50 are slightly diagonal and engage diagonal racks (not shown) in the recess 55. This effects the desired results when the case 50 rotates, and the outer case 51 also rotates relatively, and may be shifted longitudinally at the same time.

It is, therefore, considered that this oil control method compares with the belt and cain control method to provide exactly the same speed regulatory results. It is, therefore, to be understood that this invetnion lies primarily in the adaptation of planetary systems in which the outer case is same, is free to rotate and is not anchored as is convetnionally the case. Also the mechanical means adopted to produce these regulatory results form the balance of my invented apparatus.

Figure 9:
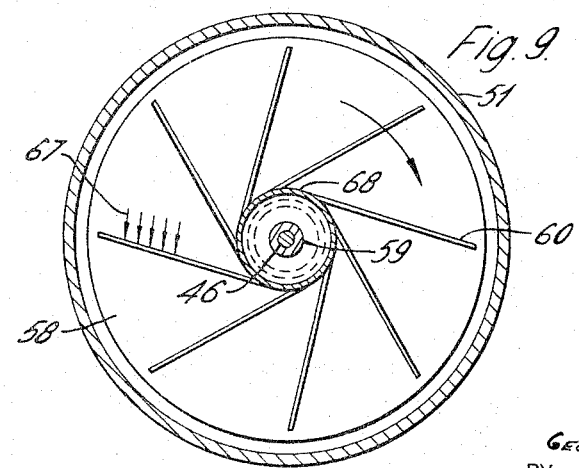
FIGURE 9 is a section substantially along the lines 9—9 of FIGURE 7.

In further explanation of the operation of this latter form of application, the oil will be pressurized by the rotating paddles 56 and 56', and as it flows against the baffles 60 on the disc plates 57 and 58 alternatively, as indicated by arrows 67 in FIGURE 9, will retard the rotation of these disc plates in a measured manner. This is when consideration of the effect when the paddles 56' are in their projected position as seen to the right hand side in FIGURE 7. This is the speed controllable means of the apparatus. Still dealing with this right side, for example, the oil passes from these baffles 60 into and through a funnel 68 and back again into circulation within the case 51 for use as required in a repetitive manner as regulated by the relative manually varied spacing between paddles 56 and disc 53. The funnels 68 are spacedly attached to the rotatable baffles 60 and each partly encloses a funnel 69 spacedly attached to the oppositely rotatable case 50 of the median planetary system to channel the oil back into the space between case 50 and the disc 53 for projection through the slots therein.

The effective operations of the two planetary systems 43 and 44 are identical to those numbers 10 and 10' in FIGURE 1.

It is thus a variation of speed is attained by slowing down means in each case outlined here, giving theoretically at least, an infinite degree of speed variation from stop to top speed requirements.

Since various modifications can be made in the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:

1. A variable speed transmission unit comprising in combination a supporting framework, a driving planetary gear system mounted on one side of said framework, and a driven planetary gear system mounted on the opposite side of said framework in alignment with said first mentioned planetary gear system, each of said planetary gear systems including a free rotating annulus, a plurality of planetary gears engaging the inner periphery of said annulus, a spider frame within said annulus upon which said planetary gears are mounted, and a sun gear engageable between said planetary gears, a drive shaft connected to said sun gear of said drive planetary gear system, a driven shaft extending between said spider frame of said drive planetary gear system, and said sun gear of said driven planetary gear system, and means within said framework for varying the rotational relationship between said planetary gear systems, said means including a pair of back-to-back cone faced pulleys freely mounted on said driven shaft, a complementary cone faced pulley for each of said back-to-back cone faced pulleys also mounted on said driven shaft, one of said complementary cone faced pulleys being connected to and rotatable with the annulus of said drive planetary gear system, the other of said complementary cone faced pulleys being connected to and rotatable with the annulus of said driven planetary gear system, a lay shaft journalled for rotation within said framework spaced from and parallel to said driven and driven shafts, a double cone faced pulley mounted for rotation on said lay shaft, a complementary cone faced pulley on each side of said double cone faced pulley also journalled for rotation upon said lay shaft, drive means extending between each pair of cone faced pulleys on said driven shaft and each pair of cone faced pulleys on said lay shaft, and means for controlling the longitudinal movement and hence the distance between the pairs of pulleys on said lay shaft and hence the pairs of pulleys on said driven shaft.

2. The device according to claim 1 in which said drive means comprises chain link belts, a plurality of radially extending racks from said cone faced pulleys, a plurality of complementary and parallel grooves also formed on said cone faced pulleys, a spindle extending transversely between each pair of grooves and slidable radially therein, a spur gear on each end of said spindles engageable with said racks, and a pinion secured centrally on each of said spindles between said spur gears, the link pins of said chain link belt engageable with said pinions.

3. The device according to claim 1 in which said means for controlling the longitudinal movement between pairs of pulleys on said lay shaft includes a sleeve affixed to said lay shaft and movable longitudinally therewith, said double faced cone pulley being bearably supported for free rotation in said sleeve, but movable longitudinally therewith, one end of said lay shaft being worm threadably supported in one side of said framework so that manual rotation of said lay shaft is adapted to shift same endwise, sleeves freely mounted for endwise movement on said lay shaft upon each side of said double cone faced pulley, said complementary cone faced pulleys on said lay shaft being journalled for free rotation on said sleeve, but movable longitudinally therewith, a pair of rods secured to said last mentioned sleeve and passing freely through said first mentioned sleeve and through said framework, a rack on one end of each of said rods adjacent said worm threaded end of said lay shaft and gears between each of said racks and said worm threaded end whereby rotation of said lay shaft is adapted to move said double faced cone pulley in one direction and said complementary cone faced pulleys in the other direction along said lay shaft.

4. The device according to claim 2 in which said means for controlling the longitudinal movement between pairs of pulleys on said lay shaft includes a sleeve affixed to said lay shaft and movable longitudinally therewith, said double faced cone pulley being bearably supported for free rotation on said sleeve, but movable longitudinally therewith, one end of said lay shaft being worm threadably supported in one side of said framework so that manual rotation of said lay shaft is adapted to shift same endwise, sleeves freely mounted for endwise movement on said lay shaft upon each side of said double cone faced pulley, said complementary cone faced pulleys on said lay shaft being journalled for free rotation on said sleeve, but movable longitudinally therewith, a pair of rods secured to said last mentioned sleeve and passing freely through said first mentioned sleeve and through said framework, a rack on one end of each of said rods adjacent said worm threaded end of said lay shaft and gears between each of said racks and said worm threaded end whereby rotation of said lay shaft is adapted to move said double faced cone pulley in one direction and said complementary cone faced pulleys in the other direction along said lay shaft.

References Cited
UNITED STATES PATENTS
1,727,232   9/1929   Farrell _____ 74—89

DONLEY J. STOCKING, Primary Examiner.

JOHN R. BENEFIEL, Assistant Examiner.